US008406540B2

(12) United States Patent
Cho

(10) Patent No.: US 8,406,540 B2
(45) Date of Patent: Mar. 26, 2013

(54) MULTISAMPLING WITH REDUCED BIT SAMPLES

(75) Inventor: Kwang-Bo Cho, Los Angeles, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 13/473,037

(22) Filed: May 16, 2012

(65) Prior Publication Data

US 2012/0263396 A1  Oct. 18, 2012

Related U.S. Application Data

(62) Division of application No. 12/910,215, filed on Oct. 22, 2010, now Pat. No. 8,200,031, which is a division of application No. 12/188,063, filed on Aug. 7, 2008, now Pat. No. 7,844,137, which is a division of application No. 10/435,056, filed on May 12, 2003, now abandoned.

(51) Int. Cl.
*G06K 9/36* (2006.01)
*H03M 3/00* (2006.01)
(52) U.S. Cl. ................... 382/232; 382/239; 341/144
(58) Field of Classification Search .............. 382/233, 382/235, 244–248, 297, 240, 232, 284; 375/240.11, 375/240.19, 240.16
See application file for complete search history.

(56) References Cited

U.S. PATENT DOCUMENTS

| | | | |
|---|---|---|---|
| 3,831,167 A | 8/1974 | Tewksbury | |
| 4,206,447 A | 6/1980 | Ching et al. | |
| 4,437,087 A * | 3/1984 | Petr | 341/51 |
| 4,453,158 A | 6/1984 | Bluethgen | |
| 4,488,175 A | 12/1984 | Netravali | |
| 4,764,748 A | 8/1988 | Geen et al. | |
| 4,849,758 A | 7/1989 | Rosebrock | |
| 5,008,739 A * | 4/1991 | D'Luna et al. | 348/246 |
| 5,010,347 A | 4/1991 | Yukawa | |
| 5,014,127 A * | 5/1991 | Richards | 348/384.1 |
| 5,249,148 A * | 9/1993 | Catherwood et al. | 708/491 |
| 5,266,952 A | 11/1993 | Stone et al. | |
| 5,291,430 A * | 3/1994 | Asghar et al. | 708/620 |
| 5,309,183 A * | 5/1994 | Sasaki et al. | 348/231.7 |
| 5,334,977 A * | 8/1994 | Kato | 341/76 |
| 5,758,195 A * | 5/1998 | Balmer | 712/300 |
| 5,796,731 A * | 8/1998 | Mellado et al. | 370/362 |
| 5,822,457 A | 10/1998 | Yeh | |
| 5,844,514 A | 12/1998 | Ringh et al. | |
| 5,973,629 A | 10/1999 | Fujii | |
| 6,359,626 B1 | 3/2002 | Akeley | |
| 6,448,912 B1 | 9/2002 | Berezin | |
| 6,469,739 B1 | 10/2002 | Bechtel et al. | |
| 6,744,929 B1 | 6/2004 | Okada | |
| 6,771,830 B2 | 8/2004 | Goldstein et al. | |
| 6,873,734 B1 | 3/2005 | Zandi et al. | |
| 2002/0041248 A1 * | 4/2002 | Galton | 341/156 |
| 2003/0058346 A1 | 3/2003 | Bechtel et al. | |

OTHER PUBLICATIONS

Jiang "A Low-Cost Content-Adaptive and Rate-Controllable Near-Lossless Image Codec in DPCM Domain", IEEE Transactions on Image Processing, vol. 9, No. 4, Apr. 2000.

(Continued)

*Primary Examiner* — Andrae S Allison
(74) *Attorney, Agent, or Firm* — Dickstein Shapiro LLP

(57) ABSTRACT

A relatively non-complex signal processor supporting an active pixel sensor imaging system is disclosed. The signal processor only requires the first sample from a group of samples in a multiple sample to be transmitted to the signal processor at full resolution. The subsequent samples in that group can be transmitted using only a subset of least significant bits. The minimum number of required LSBs is based upon the level of noise in the system. In one embodiment, the number of LSBs transmitted is k+2 per sample, where k indicates the number bits corresponding to peak noise. In an alternative embodiment, each subsequent sample is transmitted using only k+1 bits.

8 Claims, 5 Drawing Sheets

OTHER PUBLICATIONS

Emami et al., "DPCM Picture Transmission Over Noisy Channels with the Aid of a Markov Model" IEEE Transactions on Emage Processing, vol. 4, No. 11, Nov. 1995.

Yu et al., "A Novel DPCM Algorithm Using a Nonlinear Operator", Image Processing, 1994. Proceedings. ICIP-94., IEEE International Conference Publication Date: Nov. 13-16, 1994, on pp. 871-875 vol. 3.

Kuo et al., "A prequantizer with the human visual effect for the DPCM" Signal Processing: Image Communication 8 (1996) 433-442.

* cited by examiner

MULTISAMPLING WITH REDUCED BIT SAMPLES

CROSS-REFERENCE TO RELATED APPLICATIONS

This application is a divisional of application Ser. No. 12/910,215, filed Oct. 22, 2010 now U.S. Pat. No. 8,200,031, which is a divisional of application Ser. No. 12/188,063, filed Aug. 7, 2008 now U.S. Pat. No. 7,844,137, which is a divisional of application Ser. No. 10/435,056, filed May 12, 2003 now abandoned, the contents of each of which are hereby incorporated by reference in their entirety.

FIELD OF INVENTION

The present invention relates generally to analog-to-digital conversion of multiple digital signal samples, and more particularly to a method and apparatus for performing multiple digital sampling using a reduced number of bits.

BACKGROUND OF THE INVENTION

A digital imaging device may be arranged to produce digital image signals using multiple digital samples of pixel signals. FIG. 1 is a block diagram of an exemplary imaging sensor system 100. The system 100 includes an active pixel sensor array 101, which includes a plurality of pixels P arranged in an array. The array 101 is coupled via pairs of signal lines 111 to a plurality of sample-and-hold circuits 102a. The plurality of sample-and-hold circuits 102a are coupled to an analog-to-digital converter 102b via signal line 112a. The analog-to-digital converter 102b is coupled to a buffer 103 via data path 112b, and the buffer 103 is coupled to a signal processor 104 via a data path 113. The system 100 converts optical information focused upon the pixels P of the array 101 into a processed electronic signal S. The system 100 includes other well known components, such as a memory controller, a timing controller, a column decoder, and a row decoder, which are not illustrated in order to avoid cluttering the figure. The system 100 may also include additional components for further processing or using the signal S, such as mass storage devices, display drivers, etc.

Each pixel P of array 101 produces two signals, namely a reset signal Vrst and a photo signal Vsig. The reset signals Vrst of each pixel P in a selected row are simultaneously output via a respective column line 111 to a corresponding sample-and-hold circuit in the plurality of sample-and-hold circuits 102a. At a different time the photo signals Vsig of each pixel in the selected row are similarly output using respective lines 111. The sample-and-hold circuit 102a includes a differential amplifier output stage which subtract the reset and photo signals (Vrst−Vsig) which represent the incident light on a pixel.

The analog-to-digital converter 102b sequentially converts the electrical signal from each one of the sample-and-hold circuits 102a into digital form, and provides the digital data via data path 112b to a buffer 103.

The system 100 supports multiple sampling. Multiple sampling is a technique where multiple samples are taken of the same pixel and each sample is stored for further processing. When multiple sampling, the system repeatedly performs the above described processing so that each pixel has its photo and reset signal repeatedly read, converted to a single electric signal, and converted to digital form. The multiple digital values are stored in separate locations of the buffer 103 so that they can be separately accessed by the signal processor 104 over data path 113.

One reason for performing multiple sampling is to reduce the effect of noise. Since noise is a random signal, the noise component across several samples should at least partially cancel out. Thus, if multiple samples were summed and then divided by the number of samples, the noise components should be diminished and the resulting average value over the multiple samples should be a more accurate reflection of the true signal value.

The drawback to using multiple sampling is one of increased logic complexity. For example, the system 100 may utilize four times multisampling. That is, each pixel is sampled four times. In order to calculate an average value over four samples, the four samples must be summed, which requires the use of a wide adder. More specifically, for four times multiple sampling, the adder must be two bits wider than the full resolution of each sample. Another drawback of using multiple sampling is the increased communication bandwidth required to transmit the multiple samples from the buffer 103 to the signal processor 104. For example, four times multisampling requires four times the input-output bandwidth between the buffer 103 and the signal processor 104.

SUMMARY OF THE INVENTION

The present invention provides a signal processor which supports multiple signal sampling. The signal processor does not require full resolution transmission of each one of the multiple samples, thereby decreasing the data throughput requirement between the signal processor and the buffer memory. Rather, the first one of a set of multiple samples is transmitted from the buffer memory to the signal processor at full resolution. A subset of least significant bits of each subsequent sample are then transmitted from the memory to the signal processor. The size of the required subset is dependent upon the level of noise within the system. The signal processor is able to produce a sum of the multiple pixel samples utilizing the transmitted full resolution sample and the subsets of subsequent samples. The multiple signal sampling employed in the invention may be applied to pixel signals of an active pixel sensor imaging system.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
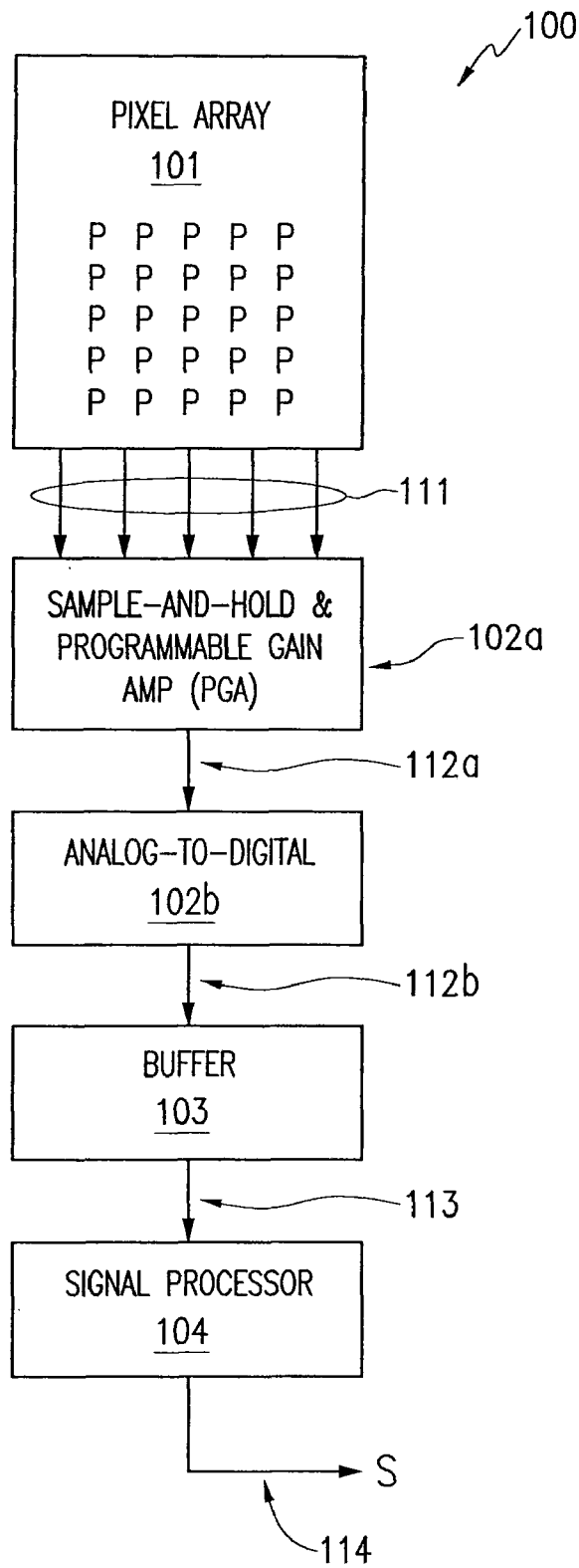
FIG. 1 is a block diagram of a prior art active pixel sensor imaging system.
Figure 2:
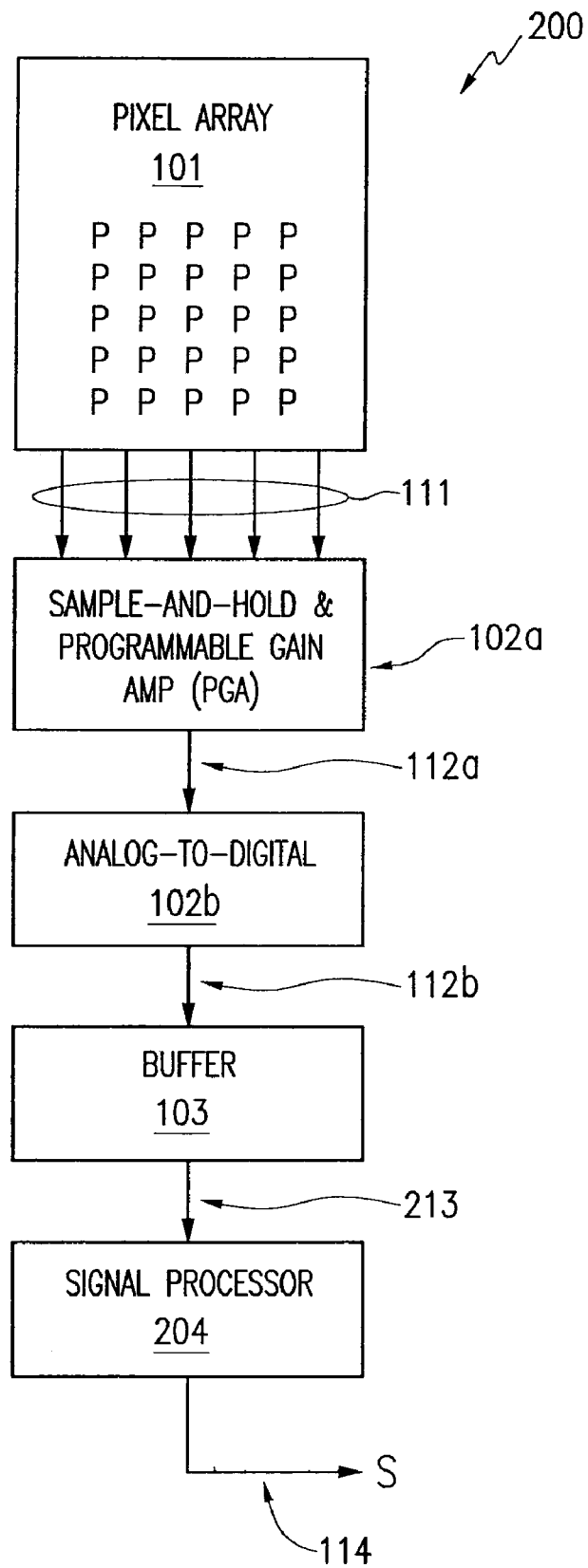
FIG. 2 is a block diagram of an active pixel sensor imaging system.

The invention will now be described below in the context of its use with multiple digital samples of pixel signals form a digital image. However, the invention has applicability in any context employing multiple digital signal samples. Now referring to the drawings, where like reference numeral designate like elements, there is shown in FIG. 2 an exemplary embodiment of the invention employed in an image system 200. System 200 is similar to system 100 and shares several common parts. For example, both systems 100 and 200 utilize the same pixel array 101, sample-and-hold circuits 102, and buffer 103. In one exemplary embodiment, the pixel array 101 may be a VGA resolution (e.g., 640×480) pixel array and the analog-to-digital converter produces 10-bit samples. System 200, however, utilizes a signal processor 204, which is operated differently from that of FIG. 1. Like system 100, system 200 also supports multiple sampling.

When performing multiple sampling, each sample is generally at a different, but similar value. The difference in values are caused by noise in system 200. The amount of noise can be characterized by k, which indicates the power of the peak noise level in the system 200 as a number of bits. For example, if performing four times multisampling of a pixel results in sample values (in decimal notation) of 512, 511, 509, and 515, the difference between the highest sample (515) and the lowest sample (509) is 6, which can be encoded by 3 bits. If further sampling confirms that no two samples of the same pixel exceed a difference of 7 then k can be set to 3 because 3-bits is the minimum number of bits required to express that difference.

The signal processor 204 is capable of calculating a sum of a group of multiple samples without requiring the full resolution of each sample in the group to be transmitted to the signal processor. More specifically, the signal processor 204 requires the first sample of a group of samples to be transmitted to the signal processor at full resolution, while each of the remaining samples only needs to be transmitted using a subset of their least significant bits. The number of least significant bits required to be transmitted is at least a function of the noise level in the system 200, and in one exemplary embodiment is equal to k+2 bits. If the buffer 103 supports data transmission at both full and partial resolutions (i.e., if buffer 103 can be toggled to output different word sizes, one corresponding to the full sample width and at least another corresponding to the k+2 least significant bits of a sample), the subsequent samples can be transmitted using only their k+2 least significant bit portions, thereby decreasing data throughput requirements. For example, if system 100 (FIG. 1) were operated at four times multiple sampling, 10-bits per sample, and has a noise level corresponding to k=3 would require 40-bits (four samples times 10-bits per sample) of communication bandwidth on data path 113. In contrast, a system 200 would require only 25 bits (10-bits for the first sample and 5-bits for each subsequent sample) to be communicated on data path 213. Using these parameters with the system 200 therefore reduces the required communication bandwidth to approximately 63% of the prior art system 100. Alternatively, buffer 103 may transmit each sample at full sample width and the signal processor 204 can mask out the appropriate set of most significant bits from each of the subsequent samples and process only 25 bits.

From a theoretical perspective, signal processor 204 is capable of operating with fewer communicated bits because the signal processor is capable of reconstructing the full resolution of the subsequent samples from just their respective least significant bits. This is because the effect of noise is bounded and the number of least significant bits (i.e., k+2) is a function of at least the noise. More specifically, Table 1 below provides a set of rules for identifying the non-transmitted most significant bits (MSBs) of the subsequent samples. In Table 1, the $(k+2)^{th}$ bit in the first sample is compared against the $(k+2)^{th}$ and $(k+1)^{th}$ bits in a subsequent sample. The MSBs of each of the subsequent samples will be either identical to, one less than, or one greater than, the corresponding MSBs of the first sample.

TABLE 1

|  |  | $(k+2)^{th}$ bit in first sample | |
| --- | --- | --- | --- |
|  |  | 0 | 1 |
| $(k+2)^{th}$ and $(k+1)^{th}$ bits in a subsequent samples | 0, 0 | The MSBs of the subsequent sample are identical to MSBs of the first sample. | The MSBs of the subsequent sample are equal to MSBs of the first sample plus 1. For example, if the MSB portion of the first (i.e., the full resolution) sample were "10011," if the $(k+2)^{th}$ bit in that first sample were equal to 1, and the $(k+2)^{th}$ and $(k+1)^{th}$ of a subsequent sample were respectively 0 and 0, the MSB of that subsequent sample would be 10011 + 1 or 10100. |
|  | 0, 1 | The MSBs of the subsequent sample are identical to MSBs of the first sample | The MSBs of a subsequent sample are identical to MSBs of the first sample. |
|  | 1, 0 | The MSBs of the subsequent sample are identical to MSBs of the first sample | The MSBs of a subsequent sample are identical to MSBs of the first sample. |
|  | 1, 1 | The MSBs of a subsequent sample are equal to MSBs of the first sample minus 1. For example, if the MSB portion of the first (i.e., the full resolution) sample | The MSBs of a subsequent sample are identical to MSBs of the first sample. |

TABLE 1-continued

| | $(k + 2)^{th}$ bit in first sample | |
|---|---|---|
| 0 | | 1 |
| | | were "10011," if the $(k + 2)^{th}$ bit in that first sample were equal to 0, and the $(k + 2)^{th}$ and $(k + 1)^{th}$ of a subsequent sample were respectively 1 and 1, the MSB of that subsequent sample would be 10011 − 1 or 10010. |

In multiple sampling systems, one frequently performed mathematical operation is calculation of an average value of a group of samples, which can be performed by calculating a sum of the group of samples and then dividing that sum by the number of samples. If the number of samples is a power of 2, as in one exemplary embodiment, the division step can be performed by shifting the sum by a number of bits equal to $\log_2(N)$, where N is the number of samples. As noted in the background, the average value calculation for a signal, e.g., a pixel signal, may permit a more accurate indication of a sample value because the effect of noise, a uncorrelated signal, may be at least partially cancelled out in the summing portion of the calculation.

The summing operation is traditionally performed using a multi-bit adder circuit. If the samples each have a 10-bit resolution and there are four samples per sample group (i.e., the degree of multiple sampling is 4), an traditional adder capable of summing the samples is required to be at least a 12-bit adder, which require a large number of gates. However, by taking advantage of the rules set forth in Table 1, above, simpler circuitry can be used to calculate the sum.

Figure 3:
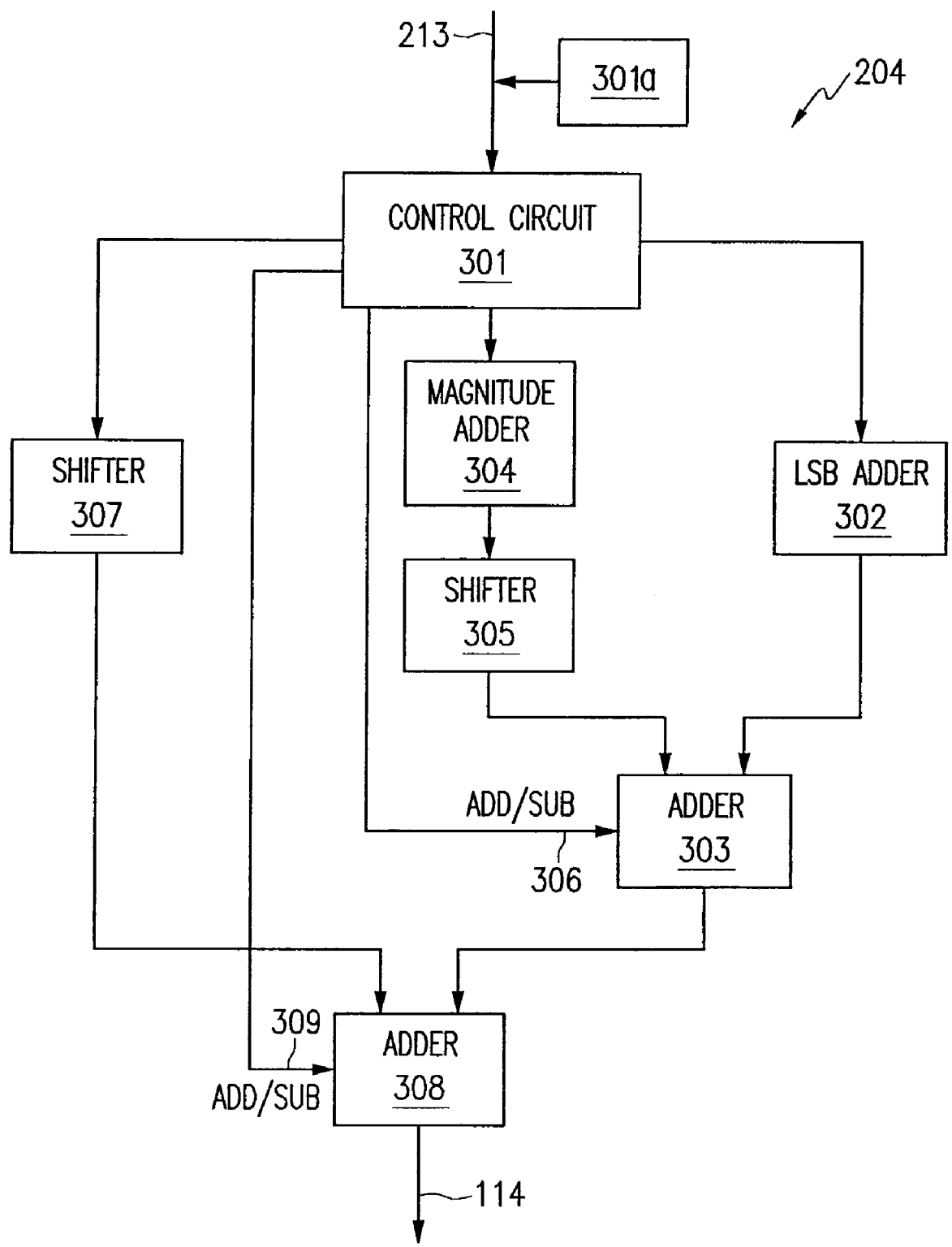
FIG. 3 is a block diagram of a signal processor.

FIG. 3 is an illustrate of one implementation of a signal processor 204 which takes advantage of the properties of Table 1. The signal processor 204 is illustrated as having a control circuit 301, a LSB adder 302, an adder 303, a magnitude adder 304, a shifter 305, a shifter 307, and an adder 308. The control circuit 301 includes signal lines 306, 309 which can respectively toggle adders 303, 308 between addition and subtraction modes. The control circuit 301 can be any type of circuit or device capable of asserting control signals to govern the below described processing. For, example, the control circuit 301 can be a programmed logic array (PLA), or a microcontroller, or a general purpose microprocessor. The control circuit 301 may be assisted by additional circuits such as a memory controller 301a for transferring data from the buffer 103.

Figure 4:
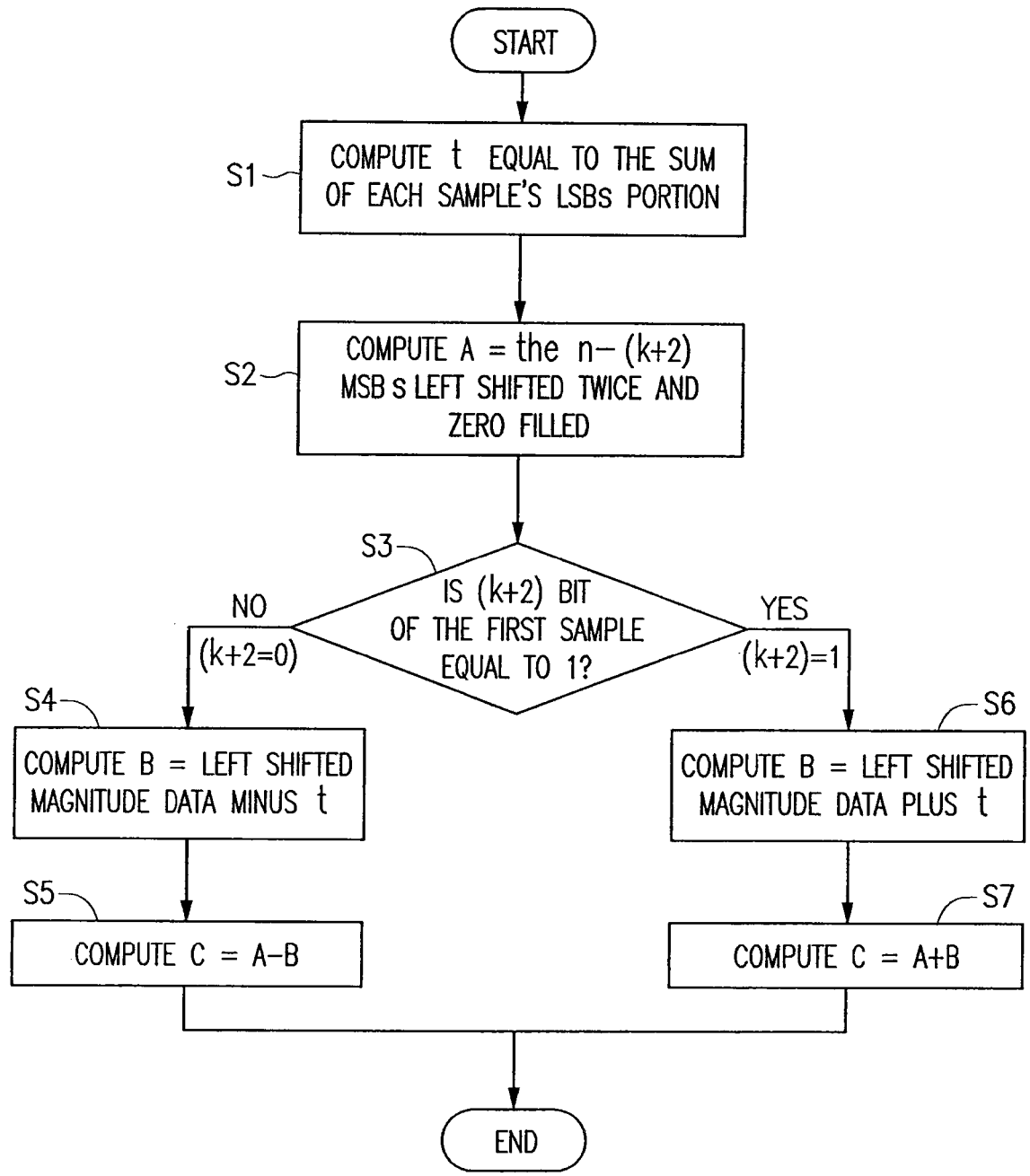
FIG. 4 is flow chart illustrating the operation of the signal processor of FIG. 3.

Now also referring to FIG. 4, the processing performed by the signal processor 204 is explained. At step S1, the control circuit 301 causes, t, a sum of the LSBs portion of each of the samples to be computed by the adder 302. In the exemplary embodiment, k=3, so the LSBs portion of each sample is (k+2) or 5-bits. In the exemplary embodiment, four times multiple sampling is used. The addition of any four binary values may produce a sum up to 2 bits wider than maximum width of the four operands. Thus, the adder 302 must be able to compute a result equal which includes up to (k+2)+2 or 7-bits wide. As described below, the variable t becomes one of the operands to adder 303.

At step S2, the control circuit 301 causes the shifter 307 to compute the variable A by twice left shifting (and filling with zeros the newly created least significant bits) the MSB portion of the first sample. In the exemplary embodiment, the sample size n=10, k=3, so the MSB portion size is n−(k+2)=5 bits. Thus, in the exemplary embodiment, A is a 7-bit number having its 5 most significant bits equal to the MSBs portion of the first sample and its 2 least significant bits equal to "00."

Steps S3-S7 correspond to an implementation of the rules of Table 1. At step S3, control circuit 301 examines the $(k+2)^{th}$ bit of the first sample. If the bit is equal to zero, execution continues with steps S4 and S5. If it is equal to one, execution instead continues with steps S6 and S7.

At step S4, the $(k+2)^{th}$ bit of the first sample has been found to be 0. The control circuit 301 examines the $(k+2)^{th}$ and $(k+1)^{th}$ bits of each sample and provides to the magnitude adder 304 a single bit magnitude of "0" as an operand if the $(k+2)^{th}$ and $(k+1)^{th}$ bits of the sample is "0,0", "0,1" or "1,0". Alternatively, a single bit magnitude of "1" is provided as an operand if the $(k+2)^{th}$ and $(k+1)^{th}$ bits of the sample is "1,1". In the exemplary embodiment, four times multiple sampling is used, so a total of four single bit magnitude values are provided to the magnitude adder 304. The magnitude adder 304 is a 2-bit adder, so any overflow to a third bit is lost. Once the magnitude adder 304 has computed a 2-bit sum of each of the single-bit magnitudes as described above, the 2-bit sum is provided to the shifter 305, and the control circuit 301 causes the shifter 305 to left shift (and zero fills newly created least significant bits) until a 7-bit number with its 2 most significant bits equal to the sum computed by the magnitude adder, and its 5 least significant bits set to 0 is created. The control circuit 301 then causes the adder 303 is to calculate the variable B as being equal to the number created from the magnitude adder minus the variable t.

At step S5, the control circuit 301 causes the adder 308 to compute the sum of the four sample as C=A−B. To obtain the average value of each sample, C must be divided by the number of samples, which in the exemplary embodiment is equal to 4, which is equal to right shifting C by 2-bits.

If at step S3, the $(k+2)^{th}$ bit were found to be 1, then execution continues from step S6. Step S6 is similar to step S4, however, B is computed as the number created from the magnitude adders plus t.

Step S7 is also similar to step S5, however, in step S7, C is computed as C=A+B.

Thus, the sum of a group of samples can be computed as described above. The variable C (at step S5 or S7) is the sum of the four samples. The variable C may be divided by the number of samples, which can be performed as a shift operation if the number of samples is a power of two.

The above description of the invention is based upon applying the rules expressed in Table 1. Thus, it should be evident that the invention may also be practiced by altering the ordering of, or parallelizing the execution of, at least some of the above described steps. As previously noted, Table 1 requires the k+2 bits of LSBs be transmitted per subsequent sample, where k characterizes the power of peak noise level as a number of bits. The above described exemplary embodiment corresponds to an embodiment which might be a typical imaging sensors. However, it should be recognized that a number of variations are possible. For example, the degree of multi-sampling, size of each sample, the power of peak noise can all be varied with corresponding adjustments to the above described system.

Figure 5:
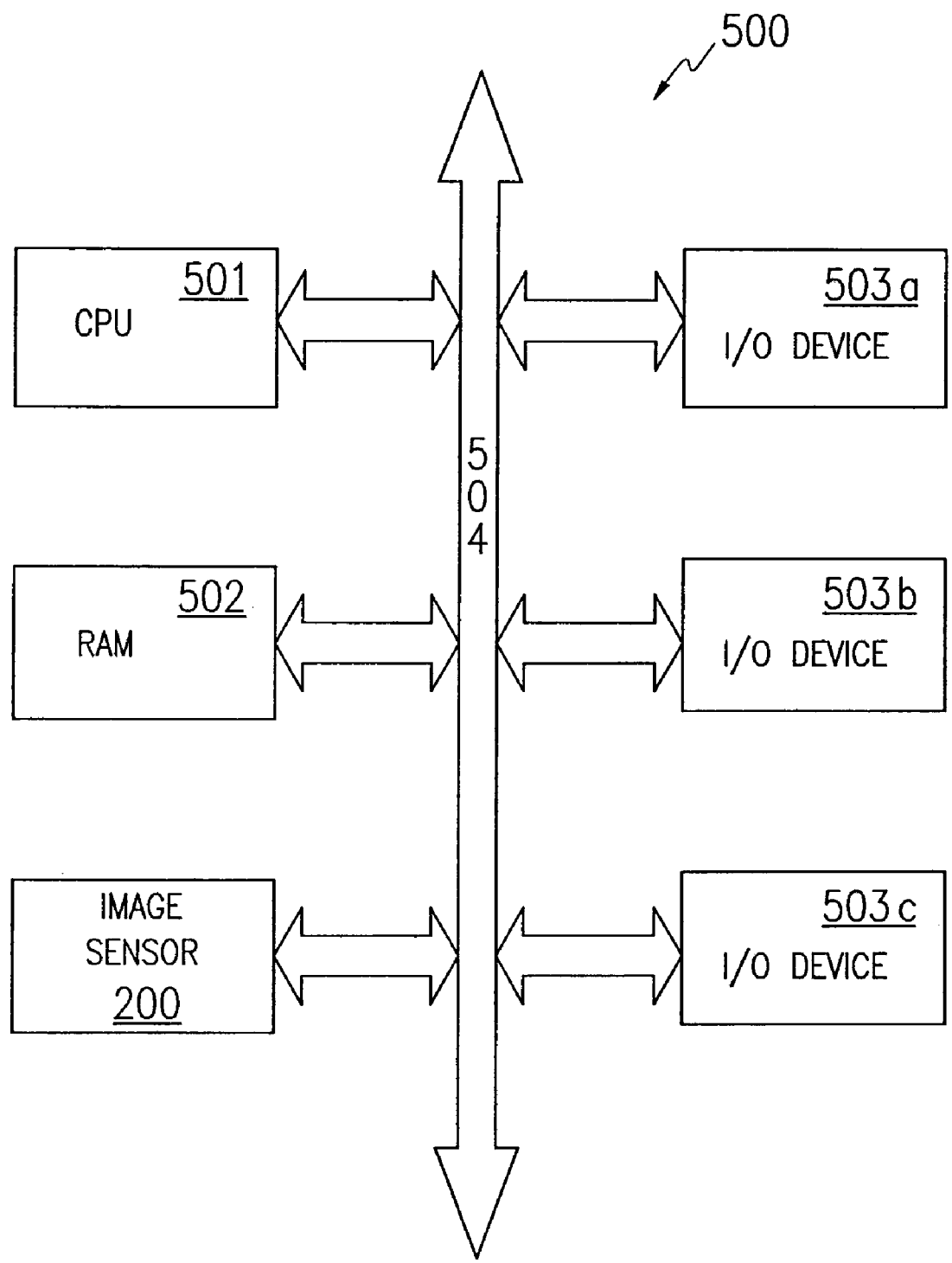
FIG. 5 is a block diagram of a computer system with the signal processor.

FIG. 5 is an illustration of a processor based system 500 which includes an imaging sensor which contains system 200 incorporating the invention as an integrated circuit. The system 500 also includes at least one CPU 501, a memory 502, and one or more I/O devices 503a-503c. A bus 504 is coupled to the CPU 501, memory 502, image sensor 200, and I/O devices 503a-503c.

From an information theory perspective, the number of least significant bits transmitted in each subsequent sample can even be reduced to k+1 bits. The rules which apply to the transmission of only k+1 least significant bits with the peak noise level corresponding to $k^{th}-(k-2)^{th}$ (for example, if k=3, then the noise level is $2^3-2^1=6$, or if k=4, then the noise level is $2^4-2^2=12$) are described in Table 2, below:

TABLE 2

|  |  | $(k+1)^{th}$, $k^{th}$ bits in the first sample | | | |
|---|---|---|---|---|---|
|  |  | 0, 0 | 0, 1 | 1, 0 | 1, 1 |
| $(k+1)^{th}$ and $k^{th}$ bits in the additional sample | 0, 0 | The MSBs of the subsequent sample are equal to the MSBs of the first sample. | The MSBs of the subsequent sample are equal to MSBs of the first sample. | If $(k-1)^{th}$ bit of the first sample is 0, then MSBs of subsequent are equal to MSBs of the first sample minus 1. If $(k-1)^{th}$ bit of the first sample is 1, then MSBs of subsequent are equal to MSBs of the first sample. | The MSBs of the subsequent sample are equal to MSBs of first sample plus 1. |
|  | 0, 1 | The MSBs of the subsequent sample are equal to the MSBs of the first sample. | The MSBs of the subsequent sample are equal to the MSBs of the first sample. | The MSBs of subsequent sample are equal to the MSBs of the first sample. | If the $(k-1)^{th}$ bit of the first sample is 0, then the MSBs of subsequent sample are equal to the MSBs of first sample. If the $(k-1)^{th}$ bit of the first sample is 1, then the MSBs of subsequent sample are equal to MSBs of the first sample plus 1. |
|  | 1, 0 | If the $(k-1)^{th}$ bit of the first sample is 0, then the MSBs of the subsequent sample are equal to MSBs of the first sample minus 1. If $(k-1)^{th}$ bit of the first sample is 1, then MSBs of the subsequent sample are equal to MSBs of first sample. | The MSBs of the subsequent sample are equal to the MSBs of the first sample. | The MSBs of the subsequent sample are equal to the MSBs of the first sample. | The MSBs of the subsequent sample are equal to the MSBs of the first sample. |
|  | 1, 1 | The MSBs of the subsequent sample are equal to MSBs of first sample minus 1. | If $(k-1)^{th}$ bit of the first sample is 0, then the MSBs of the subsequent sample is equal to the MSBs of the first sample minus 1. If $(k-1)^{th}$ bit of the first sample is 1 then the MSBs of the subsequent sample are equal to the MSBs of the first sample | The MSBs of the subsequent sample are equal to the MSBs of the first sample. | The MSBs of the subsequent sample are equal to the MSBs of the first sample. |

The set of rules expressed in Table 2 is more complex than the set of rules expressed in Table 1, and would thus require more complex circuitry at the signal processor. For this reason, the transmission of k+2 bits per subsequent sample and the use of signal processor 204 may be preferred. However, if the constraining factor in a system is communications bandwidth, then the use of k+1 bits per subsequent sample can be used to reduce the amount of data transmission. However, this will require that the signal processor 204 use the more complex rules of Table 2.

From an information theory perspective, the number of least significant bits transmitted in each subsequent sample can be reduced to (k+1) bits in an environment where the power of peak noise is equal to a k-bit signal. For a sequence of samples having an initial sample S1 which is transmitted at full resolution, and at least one subsequent sample $S_{i>1}$ each of which are transmitted with just their (k+1) least significant bits, we can recover the non-transmitted most significant bits of each subsequent sample. The non-transmitted most significant bits of each subsequent sample will either bit equal to, one greater than, or one less than the corresponding most significant bits of the initial sample.

The rules for determining which one of the three cases arises is found in Table 3, wherein x represents the (k+1) least significant bit portion of the initial sample S1, y represents the (k+1) least significant bits of a subsequent sample $S_{i>1}$, and n represents a k-bit binary number wherein each one of said k-bits is a binary '1'. For example, if the k=3, n would be a 3-bit number wherein each bit is a '1', or 111 (binary). To use Table 3, we first compute the values of x, y, n, and (y-x) and determine which one of the three categories (y-x) falls into the table:

TABLE 3

| CASE 'A' <br> n > (y − x) > −n | CASE 'B' <br> (y − x) > n | CASE 'C' −n > <br> (y − x) |
|---|---|---|
| The MSBs of the subsequent sample are equal to the MSBs of the first sample. | The MSBs of the subsequent sample are equal to the MSBs of the first sample minus 1. | The MSBs of the subsequent sample are equal to the MSBs of the first sample plus 1. |

As a first example, suppose x=$1010_2$ (10 decimal), y=0100, (4 decimal), n=$111_2$ (7 decimal). In this case, (y-x) is equal to −6, which fits into case 'A' since 7>−6>−7. In case 'A' situations, the MSBs of the subsequent sample is equal to the corresponding MSBs of the initial sample. Now, suppose y is instead 0010, (2 decimal), while x and n remain unaltered. (y-x) is equal to −8, which now fits into case 'C' instead of case 'A' since −7>−8. The rule for case 'C' is that the MSBs of the subsequent sample ($S_{i>1}$) is equal to one greater than the corresponding MSBs of the initial sample. Finally, suppose x=$0110_2$ (6 decimal), y=$1110_2$ (14 decimal), while n remains $111_2$ (7 decimal). In this instance, (y-x) is equal to 8, which now fits into case 'B' since 8>7. The rule for case 'B' is that the MSBs of the subsequent sample ($S_{i>1}$) is equal to one less than the corresponding MSBs of the initial sample (S1).

The present invention provides a method and apparatus to take advantage of the ability to characterize the influence of noise on multiple sample values. By knowing the effect of peak noise as a k-bit signal, the present invention permits encoding a plurality of sample values by only sending the first one of said plurality of sample values as a full resolution value, while the remaining values may be sent as a subset of least significant bits. The number of least significant bits required for each remaining sample value is a function of noise. Once the sample values have been received, rules such as those found in Tables 1 or 3 can be used to reconstruct the non-transmitted information content. When the rules of Table 1 is utilized in transmission, the common procedure of summing a plurality of sample values can be performed using relatively simple circuitry, to include an adder for the least significant bits, a shifter for the most significant bit portion of the first sample, and a magnitude adder. The results produced by the adder, shifter, and magnitude adder can be combined as previously described to permit relatively simple circuitry to calculate a sum of multiple samples while maintaining a low communications bandwidth requirement for the signal processor which computes the sum.

While the invention has been described in detail in connection with exemplary embodiment, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A method for computing the sum of a plurality of sample values, comprising:

calculating a sum of only a same number of least significant bits of each sample value;

calculating a magnitude from a subset of bits of said plurality of sample values;

shifting and zero-filling said magnitude;

combining said sum and said magnitude to produce a least significant bits portion of a result;

shifting and zero-filling a most significant bits portion of a first one of said plurality of samples to produce a most significant bits portion of the result; and forming said sum of a plurality of sample values using said least significant bits portion of the result with said most significant bits portion of the result.

2. The method of claim 1, wherein said same number is equal to k+2, wherein a peak noise of the signal samples can be characterized by a k-bit signal.

3. The method of claim 2, wherein said same number is equal to 5.

4. The method of claim 1, wherein the number of samples is 4.

5. The method of claim 1, wherein each sample is a 10-bit sample.

6. The method of claim 1, wherein said step of calculating a magnitude comprises:

setting an intermediate result to zero;

for each sample, if a (k+2)-bit of a first one of said plurality of samples is equal to 0, and if the (k+2)-bit and (k+1) bit are respectively 1 and 1, summing said intermediate result and 1 and storing said sum in said intermediate result; and setting said magnitude to said intermediate result.

7. The method of claim 1, wherein said magnitude is left shifted and zero filled until said magnitude is 7 bits wide.

8. The method of claim 1, where said step of combining comprises:

if a (k+2)-bit of a first of said plurality of samples is equal to 0, subtracting said sum of said same number of least significant bits from magnitude after said shifting and zero-filling; or if the (k+2)-bit of said first of said plurality of samples is equal to 1, summing said sum of said same number of least significant bits with said magnitude after said shifting and zero-filling.

* * * * *